(12) United States Patent
Tolentino

(10) Patent No.: US 11,155,241 B2
(45) Date of Patent: Oct. 26, 2021

(54) WINDSHIELD WIPER BLADE

(71) Applicant: Pylon Manufacturing Corp., Deerfiled Beach, FL (US)

(72) Inventor: Vambi Raymundo Tolentino, Coconut Creek, FL (US)

(*) Notice: Subject to any disclaimer, the term of this patent is extended or adjusted under 35 U.S.C. 154(b) by 0 days.

(21) Appl. No.: 16/525,019

(22) Filed: Jul. 29, 2019

(65) Prior Publication Data
US 2019/0351876 A1 Nov. 21, 2019

Related U.S. Application Data

(63) Continuation of application No. 15/335,138, filed on Oct. 26, 2016, now Pat. No. 10,363,905.
(Continued)

(51) Int. Cl.
*B60S 1/38* (2006.01)

(52) U.S. Cl.
CPC .............. *B60S 1/381* (2013.01); *B60S 1/3849* (2013.01); *B60S 1/3858* (2013.01);
(Continued)

(58) Field of Classification Search
CPC .... B60S 1/3858; B60S 1/3867; B60S 1/3865; B60S 1/3856; B60S 1/3851; B60S 1/381; B60S 1/3848; B60S 1/3882; B60S 1/3881; B60S 1/3875; B60S 2001/3817; B60S 2001/3818; B60S 2001/382; B60S 1/3849
(Continued)

(56) References Cited

U.S. PATENT DOCUMENTS

| 56,762 | A | 12/1920 | Minier |
| 2,310,751 | A | 2/1943 | Scinta |

(Continued)

FOREIGN PATENT DOCUMENTS

| BR | 102015007588 A2 | 4/2016 |
| DE | 10036122 | * 4/2002 |

(Continued)

OTHER PUBLICATIONS

Machine translation of description portion of German publication 212007000044, published Apr. 2009. (Year: 2009).*
(Continued)

*Primary Examiner* — Gary K. Graham
(74) *Attorney, Agent, or Firm* — The Brickell IP Group, PLLC; Javier Sobrado; A. Robert Weaver

(57) ABSTRACT

A wiper blade including an elongate wiper strip, an elastic backing element and a mounting base. The wiper strip including a lip, a wide portion, and narrower intermediate portion between the lip and the wide portion. The backing element having a top portion from which two legs descend, such that each leg includes a claw that extends towards the opposite leg and has ends that define a gap sized to receive the intermediate portion of the wiper strip. The top portion, legs and claws of defining a wiper strip cavity where the wide portion of the wiper strip is disposed. The mounting base disposed on a section of the backing element and capable of connecting the wiper blade to a wiper arm and receiving force from same, such that the mounting base applies the force from the wiper arm to the backing element, which distributes same along the wiper strip.

16 Claims, 13 Drawing Sheets

Related U.S. Application Data

(60) Provisional application No. 62/246,567, filed on Oct. 26, 2015.

(52) U.S. Cl.
CPC .......... *B60S 1/3867* (2013.01); *B60S 1/3881* (2013.01); *B60S 1/3882* (2013.01); *B60S 2001/3818* (2013.01)

(58) Field of Classification Search
USPC ...................................... 15/250.43, 250.201
See application file for complete search history.

(56) References Cited

U.S. PATENT DOCUMENTS

| | | |
|---|---|---|
| 2,550,094 A | 4/1951 | Smulski |
| 2,589,339 A | 3/1952 | Carson |
| 2,616,112 A | 11/1952 | Smulski |
| 2,643,411 A | 6/1953 | Nesson |
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynn |
| 3,192,551 A | 7/1965 | Appel |
| 3,234,578 A | 2/1966 | Goulb et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A * | 5/1975 | Palu ............... B60S 1/3881 15/250.48 |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,120,069 A | 10/1978 | Sharp et al. |
| 4,127,912 A | 12/1978 | Deibel et al. |
| 4,127,916 A | 12/1978 | van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Netsch |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |

(56) References Cited

U.S. PATENT DOCUMENTS

| | | |
|---|---|---|
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| D367,839 S | 3/1996 | Abbott et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| 5,633,932 A | 5/1997 | Davis et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 N | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Damme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |

(56) References Cited

U.S. PATENT DOCUMENTS

| | | |
|---|---|---|
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paoli et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski et al. |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weiler et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |

(56) References Cited

U.S. PATENT DOCUMENTS

| | | |
|---|---|---|
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarski et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Herincicx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer et al. |
| 7,908,703 B2 | 3/2011 | van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Baek et al. |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabbee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppen et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |
| 8,266,759 B2 | 9/2012 | Braun et al. |

(56) References Cited

U.S. PATENT DOCUMENTS

| | | |
|---|---|---|
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |
| 8,370,988 B2 | 2/2013 | Kraus et al. |
| 8,373,322 B2 | 2/2013 | Wegner et al. |
| 8,375,503 B2 | 2/2013 | Aznag |
| 8,381,348 B2 | 2/2013 | Egner-Walter et al. |
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,701,241 B2 * | 4/2014 | Kim ............... B60S 1/0408 15/250.201 |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mill et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mill et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |

(56) References Cited

U.S. PATENT DOCUMENTS

| | | |
|---|---|---|
| 9,096,196 B2 | 8/2015 | Criel et al. |
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |
| 9,272,676 B2 | 3/2016 | Heger et al. |
| D765,501 S | 9/2016 | Peers et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| D796,413 S | 9/2017 | Di Iulio |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0052865 A1 | 3/2008 | Chiang |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1 | 5/2008 | Machida et al. |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0197047 A1 | 8/2009 | Teranishi |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1* | 3/2010 | Kang ............... B60S 1/381 15/250.48 |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0251502 A1 | 10/2010 | Summerville et al. |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Bealen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0030894 A1 | 2/2012 | Garrastacho et al. |
| 2012/0047673 A1 | 3/2012 | Depondt |
| 2012/0054976 A1 | 3/2012 | Yang et al. |
| 2012/0060316 A1 | 3/2012 | Avasiloaie et al. |
| 2012/0066857 A1 | 3/2012 | Webert |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |

(56) References Cited

U.S. PATENT DOCUMENTS

| | | | |
|---|---|---|---|
| 2013/0067675 A1 | 3/2013 | Chien | |
| 2013/0067678 A1 | 3/2013 | Ehde | |
| 2013/0104334 A1 | 5/2013 | Depondt | |
| 2013/0117957 A1 | 5/2013 | Ku | |
| 2013/0125333 A1* | 5/2013 | Tolentino | B60S 1/38 15/250.451 |
| 2013/0152323 A1 | 6/2013 | Chien | |
| 2013/0152326 A1 | 6/2013 | Oslizlo et al. | |
| 2013/0152330 A1 | 6/2013 | Kim et al. | |
| 2013/0167316 A1 | 7/2013 | Egner-Walter et al. | |
| 2013/0185889 A1 | 7/2013 | Tolentino et al. | |
| 2013/0185890 A1 | 7/2013 | Ku | |
| 2013/0192015 A1 | 8/2013 | Tolentino et al. | |
| 2013/0192016 A1 | 8/2013 | Kim et al. | |
| 2013/0198992 A1 | 8/2013 | Tolentino et al. | |
| 2013/0205532 A1 | 8/2013 | Tolentino et al. | |
| 2013/0212828 A1 | 8/2013 | Coughlin | |
| 2013/0219649 A1 | 8/2013 | Tolentinto et al. | |
| 2013/0227809 A1 | 9/2013 | Tolentinto et al. | |
| 2013/0227810 A1 | 9/2013 | Tolentinto et al. | |
| 2013/0247323 A1 | 9/2013 | Geubel et al. | |
| 2013/0255026 A1 | 10/2013 | Depondt | |
| 2013/0263400 A1 | 10/2013 | Duesterhoeft et al. | |
| 2013/0291329 A1 | 11/2013 | Izabel | |
| 2013/0298348 A1 | 11/2013 | Caillot et al. | |
| 2013/0305475 A1 | 11/2013 | Kim et al. | |
| 2013/0305478 A1 | 11/2013 | Kim et al. | |
| 2013/0333145 A1 | 12/2013 | Depondt | |
| 2013/0333146 A1 | 12/2013 | Depondt | |
| 2014/0026348 A1 | 1/2014 | Schaeuble | |
| 2014/0026349 A1 | 1/2014 | Schaeuble | |
| 2014/0026350 A1 | 1/2014 | Boland | |
| 2014/0068886 A1 | 3/2014 | Ku | |
| 2014/0082875 A1 | 3/2014 | Peers et al. | |
| 2014/0115811 A1 | 5/2014 | Kim et al. | |
| 2014/0130283 A1 | 5/2014 | Boland et al. | |
| 2014/0130287 A1 | 5/2014 | Bex et al. | |
| 2014/0150198 A1 | 6/2014 | Kim et al. | |
| 2014/0182075 A1 | 7/2014 | Polocoser et al. | |
| 2014/0196241 A1 | 7/2014 | Kim et al. | |
| 2014/0259504 A1 | 9/2014 | Piotrowski et al. | |
| 2014/0259505 A1 | 9/2014 | Fournier et al. | |
| 2014/0283325 A1 | 9/2014 | Kawashima et al. | |
| 2014/0317875 A1 | 10/2014 | Tolentino et al. | |
| 2014/0338144 A1 | 11/2014 | An et al. | |
| 2014/0359963 A1* | 12/2014 | An | B60S 1/3858 15/250.201 |
| 2014/0373301 A1 | 12/2014 | Kim et al. | |
| 2015/0026908 A1 | 1/2015 | Izabel et al. | |
| 2015/0047141 A1 | 2/2015 | Houssat et al. | |
| 2015/0059116 A1 | 3/2015 | An et al. | |
| 2015/0074935 A1 | 3/2015 | An | |
| 2015/0089764 A1 | 4/2015 | Wu | |
| 2015/0121644 A1 | 5/2015 | Young, III et al. | |
| 2015/0135468 A1 | 5/2015 | Kim | |
| 2015/0151718 A1 | 6/2015 | Moll | |
| 2015/0158463 A1 | 6/2015 | Yi | |
| 2015/0166016 A1 | 6/2015 | Wang | |
| 2015/0246659 A1 | 9/2015 | Park | |
| 2015/0251636 A1 | 9/2015 | Kim et al. | |
| 2015/0251637 A1 | 9/2015 | Tolentino et al. | |
| 2015/0258965 A1 | 9/2015 | An | |
| 2015/0274130 A1 | 10/2015 | Tolentinto et al. | |
| 2015/0274131 A1 | 10/2015 | Tolentinto et al. | |
| 2015/0353054 A1 | 12/2015 | Tolentino et al. | |
| 2016/0046263 A1 | 2/2016 | Tolentino et al. | |
| 2016/0059828 A1 | 3/2016 | Tolentino et al. | |
| 2016/0159323 A1 | 6/2016 | Tolentinto et al. | |
| 2016/0280186 A1 | 9/2016 | Peers et al. | |
| 2016/0375867 A1 | 12/2016 | Tolentino et al. | |
| 2017/0057464 A1 | 3/2017 | Tolentinto et al. | |
| 2017/0072912 A1 | 3/2017 | Tolentino et al. | |
| 2017/0334400 A1 | 11/2017 | Kawashima | |
| 2017/0334404 A1 | 11/2017 | Kawashima | |
| 2017/0334406 A1 | 11/2017 | Kawashima | |
| 2017/0334407 A1 | 11/2017 | Kawashima | |
| 2017/0334769 A1 | 11/2017 | Luzzato et al. | |

FOREIGN PATENT DOCUMENTS

| | | | |
|---|---|---|---|
| DE | 10230457 A1 | | 1/2004 |
| DE | 4224866 B4 | | 1/2007 |
| DE | 212007000044 | * | 4/2009 |
| EP | 2781416 A1 | | 9/2014 |
| WO | 2017/201458 A1 | | 11/2017 |
| WO | 2017/201464 A1 | | 11/2017 |
| WO | 2017/201470 A1 | | 11/2017 |
| WO | 2017/201473 A1 | | 11/2017 |
| WO | 2017/201485 A1 | | 11/2017 |

OTHER PUBLICATIONS

Forch, R., et al., "Appendix C: Contact Angle Goniometry," Surface Design: Applications in Bioscience and Nanotechnology, pp. 471-473 (Sep. 9, 2009).

International Search Report and Written Opinion issued in PCT Application No. PCT/US2017/059275 dated Jan. 25, 2018.

Naedele, M.,"An Access Control Protocol for Embedded Devices," Industrial Informatics, 2006 IEEE International Conference on IEEE, PI, dated Aug. 1, 2006, Retrieved from the Internet URL: http://ieeexplore.ieee.org/document/4053450/, pp. 565-569.

"DuPont Wiper Blade Installation: Trapezoid Arm Style," Pylon Manufacturing Corp., dated Jan. 1, 2015, Retrieved from the Internet URL: http://http://windshield-wiperblades.com/resources?do=installation_removal&country=United%20States#, on Jul. 28, 2017, pp. 1-2.

"First Time Fit Wiper Blades: Top Lock 1 Connector Wiper Blade Installation Instructions" DENSO Auto Parts, Retrieved from the Internet URL: http://densoautoparts.com/wiper-blades-first-time-fit-wiper-blades.aspx#undefined, on Jul. 28, 2017, pp. 1-3.

Final Rejection towards U.S. Appl. No. 13/679,646 dated Jul. 14, 2017.

Office Action issued in connection with EP Application No. 12171721.9 dated Aug. 16, 2017.

Non-Final Rejection towards U.S. Appl. No. 14/715,144 dated Nov. 15, 2017.

International Search Report and Written Opinion issued in PCT Application No. PCT/US2017/033622 dated Aug. 11, 2017.

International Search Report and Written Opinion issued in PCT Application No. PCT/US2017/033629 dated Aug. 22, 2017.

International Search Report and Written Opinion issued in PCT Application No. PCT/US2017/033640 dated Aug. 23, 2017.

International Search Report and Written Opinion issued in PCT Application No. PCT/US2017/033657 dated Sep. 28, 2017.

International Search Report and Written Opinion issued in PCT Application No. PCT/US2017/033643 dated Oct. 2, 2017.

* cited by examiner

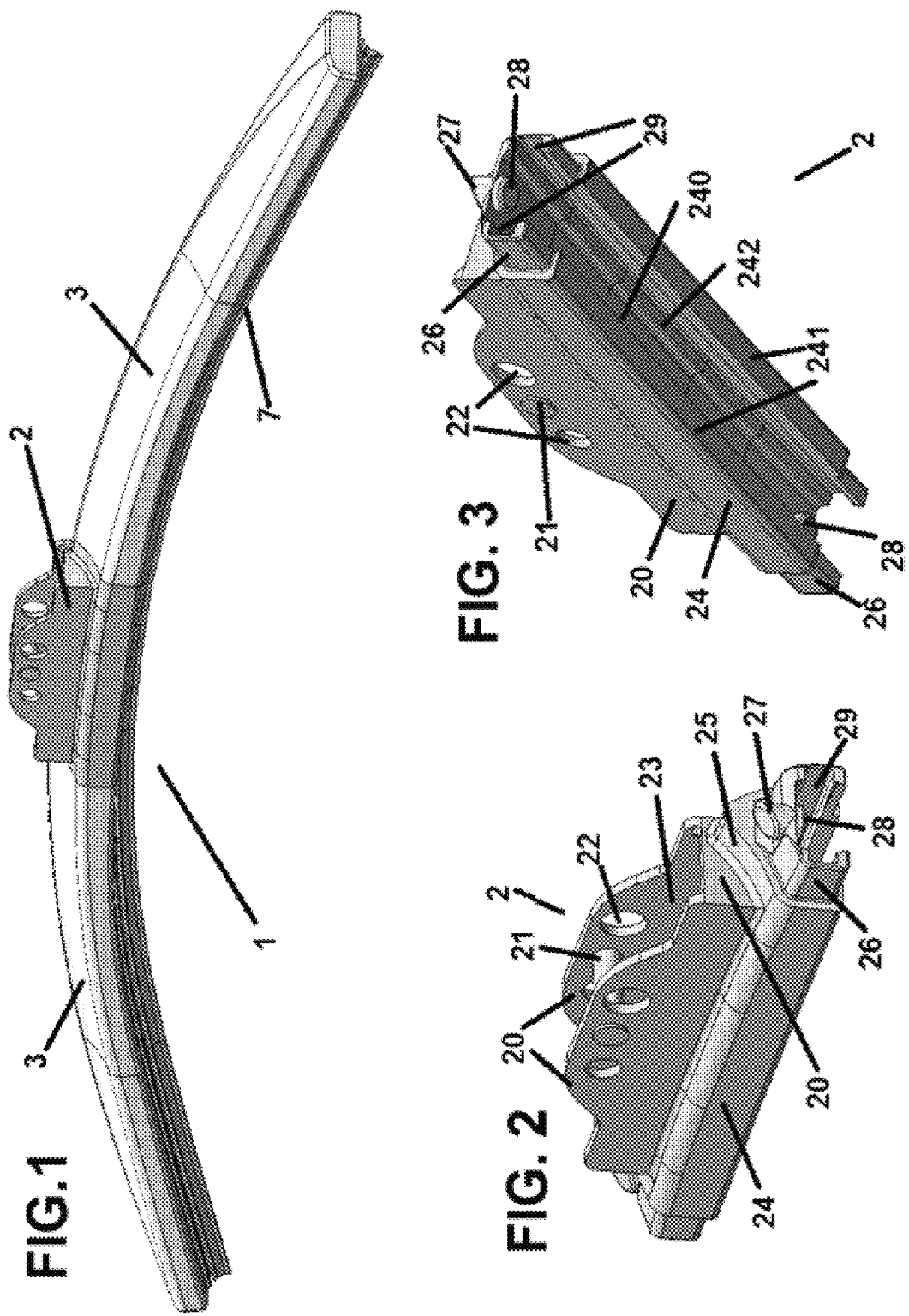

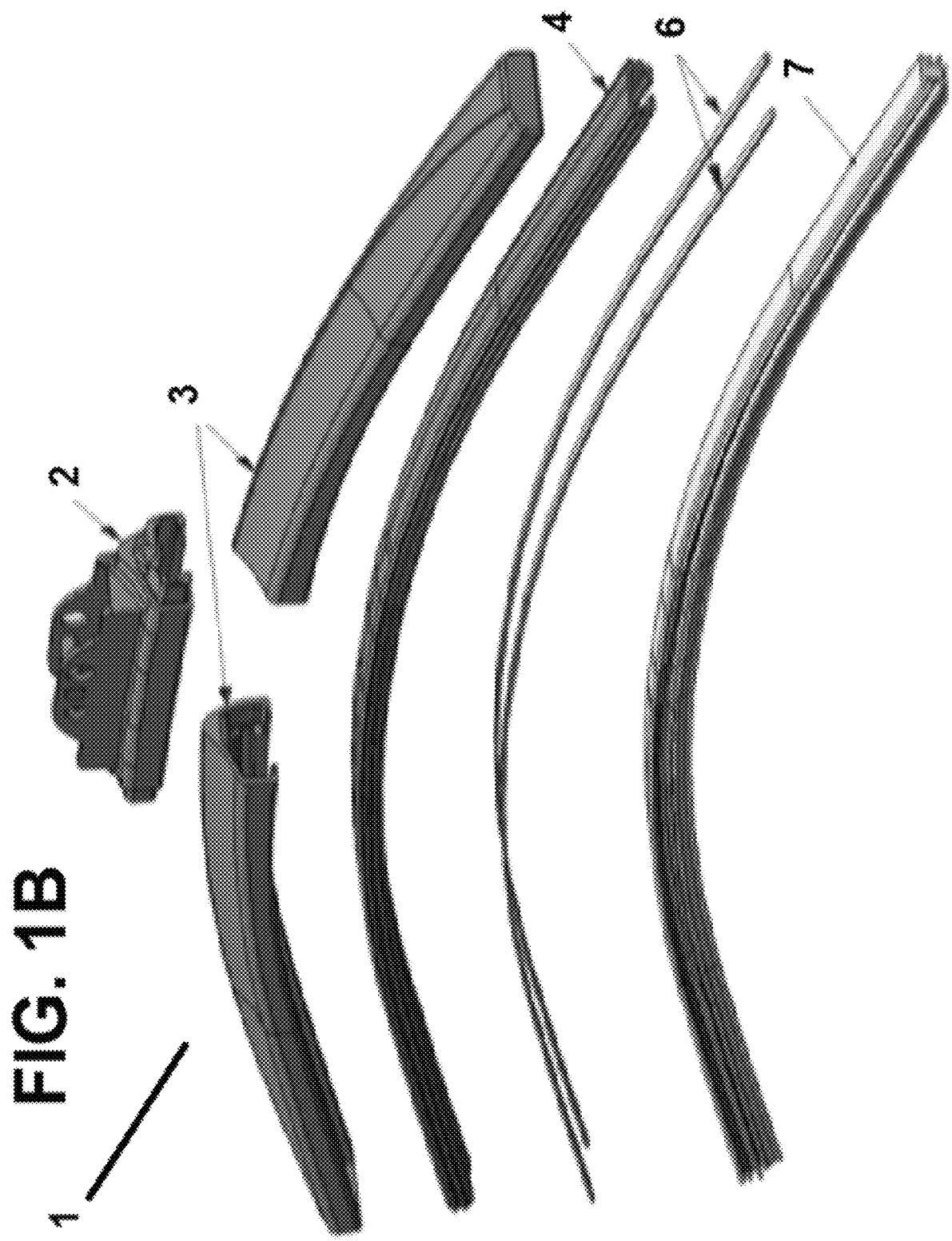

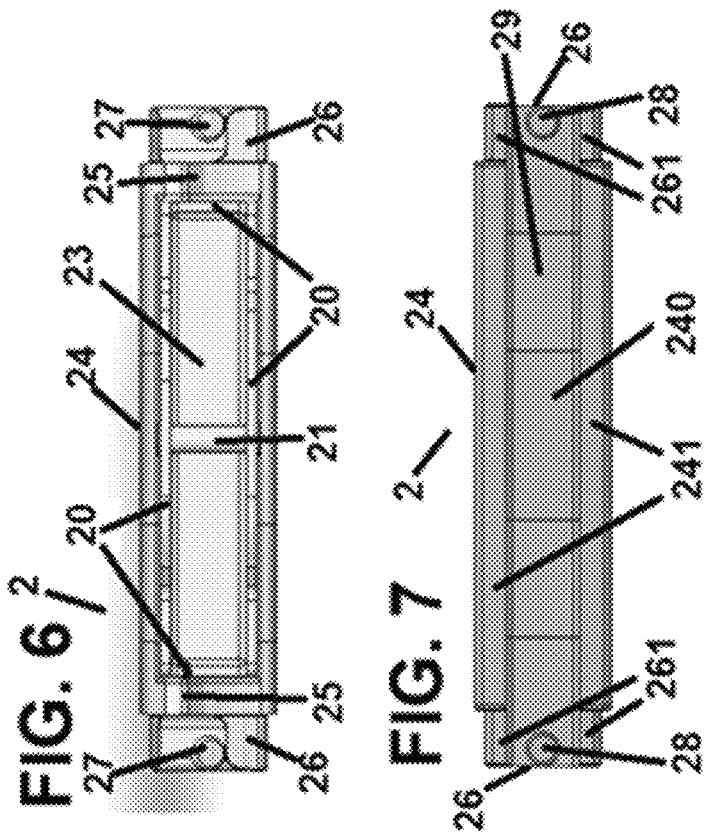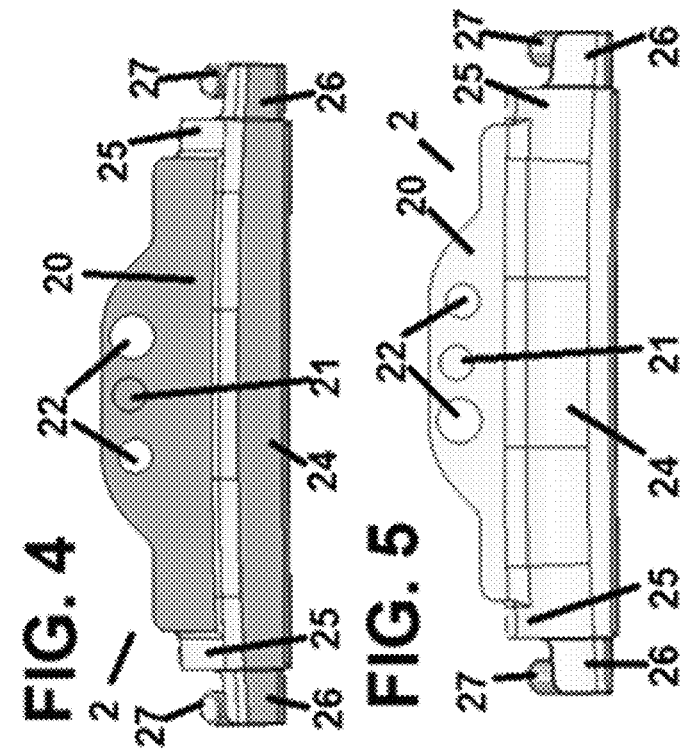

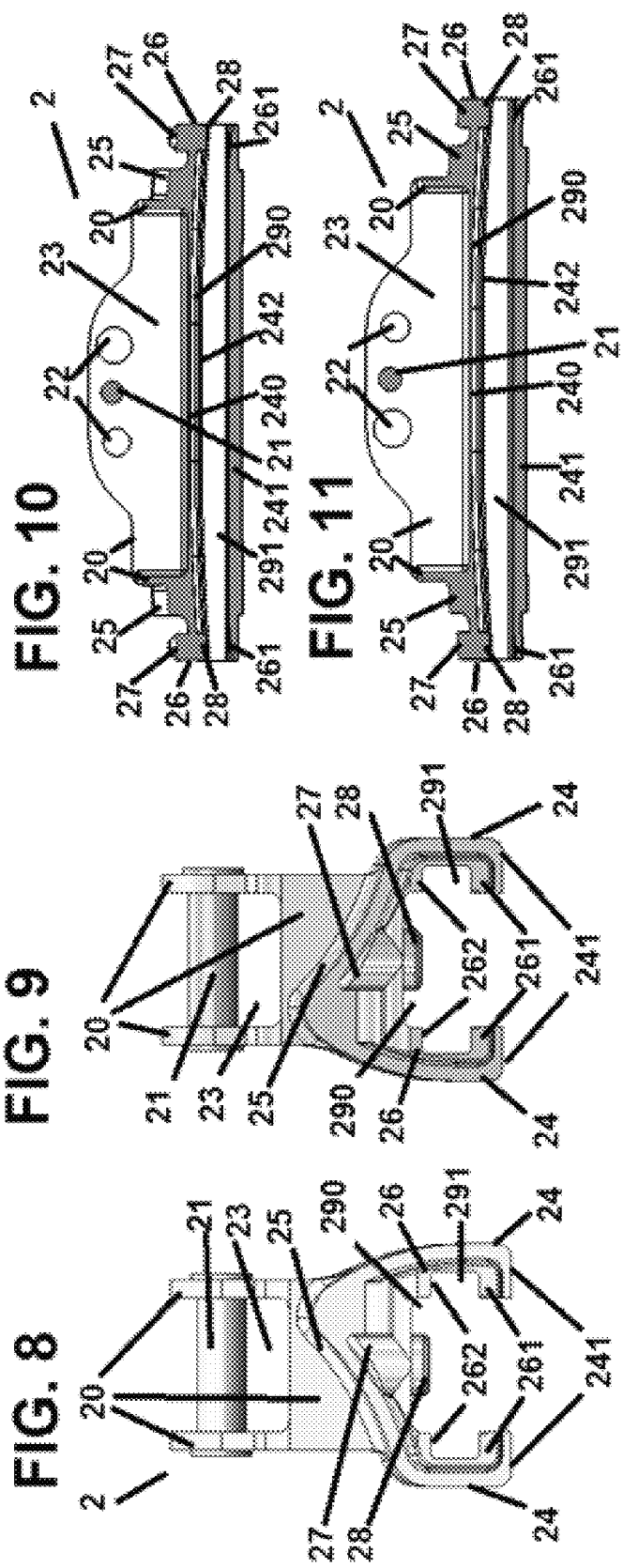

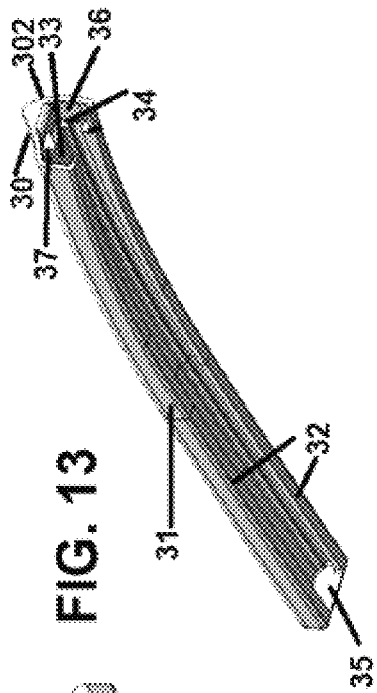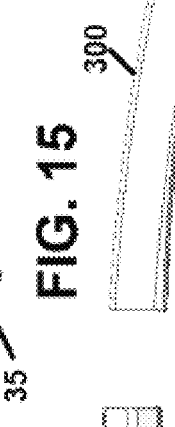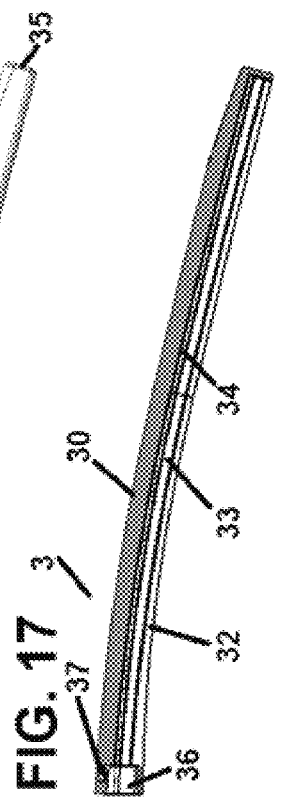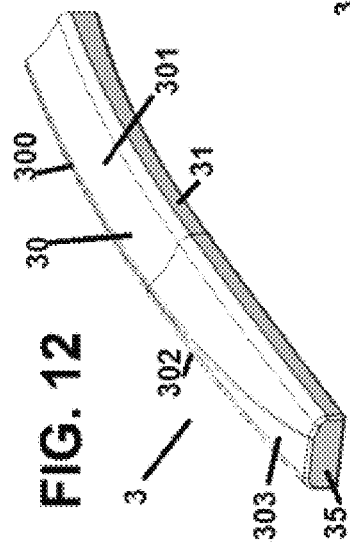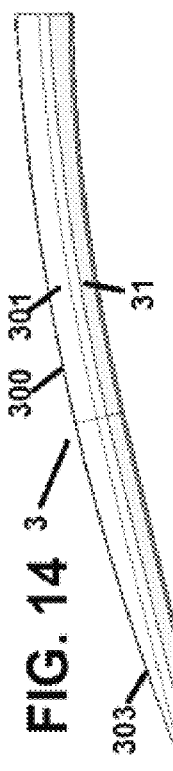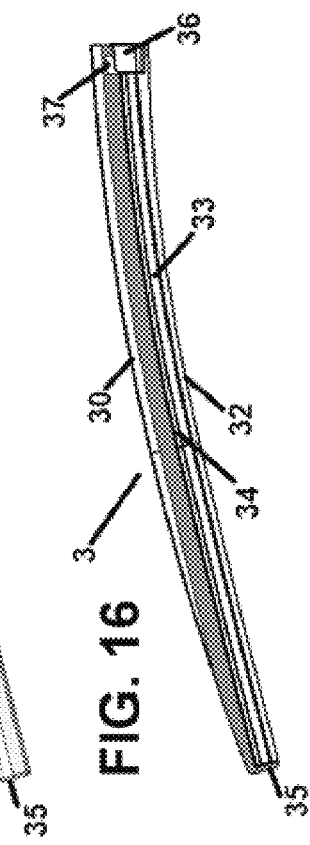

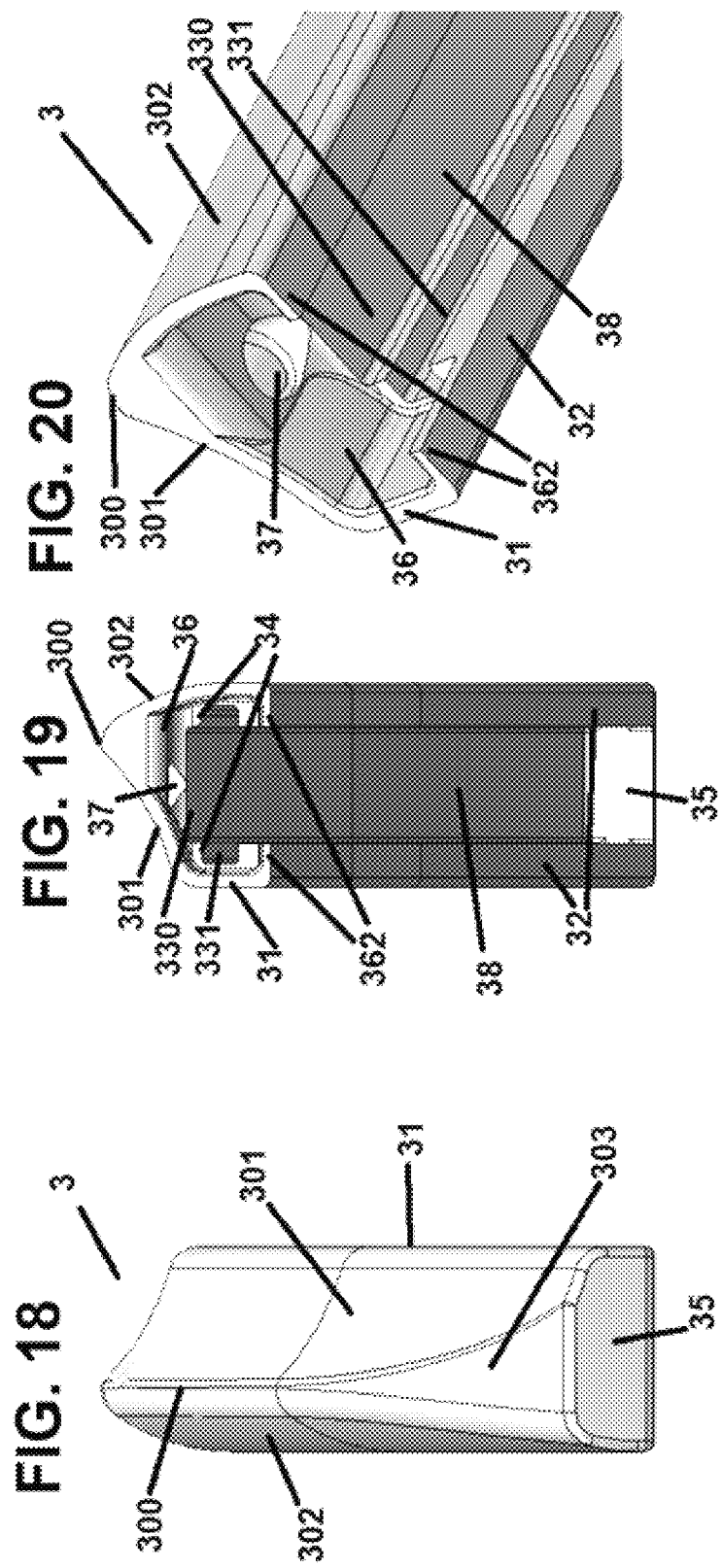

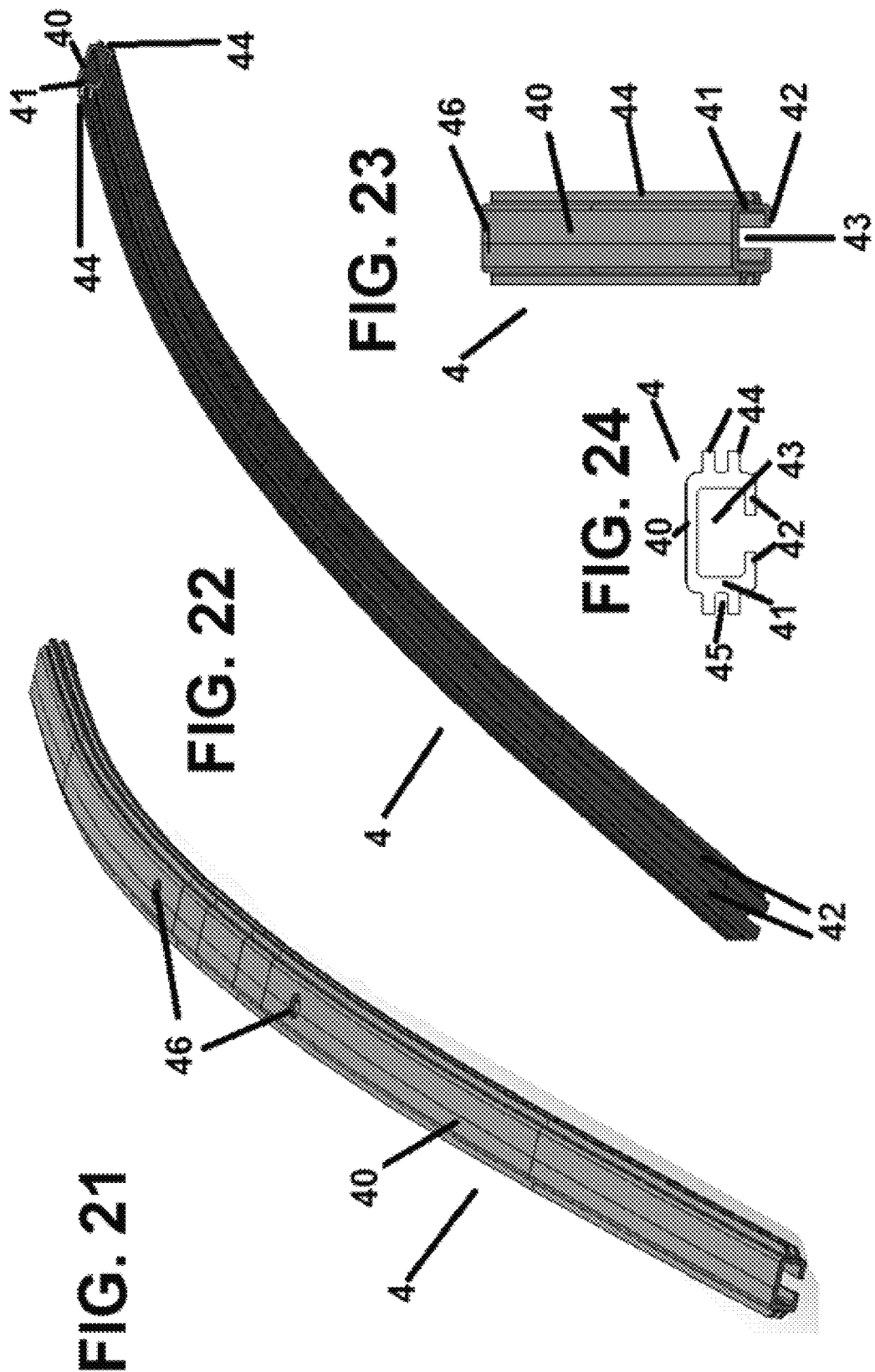

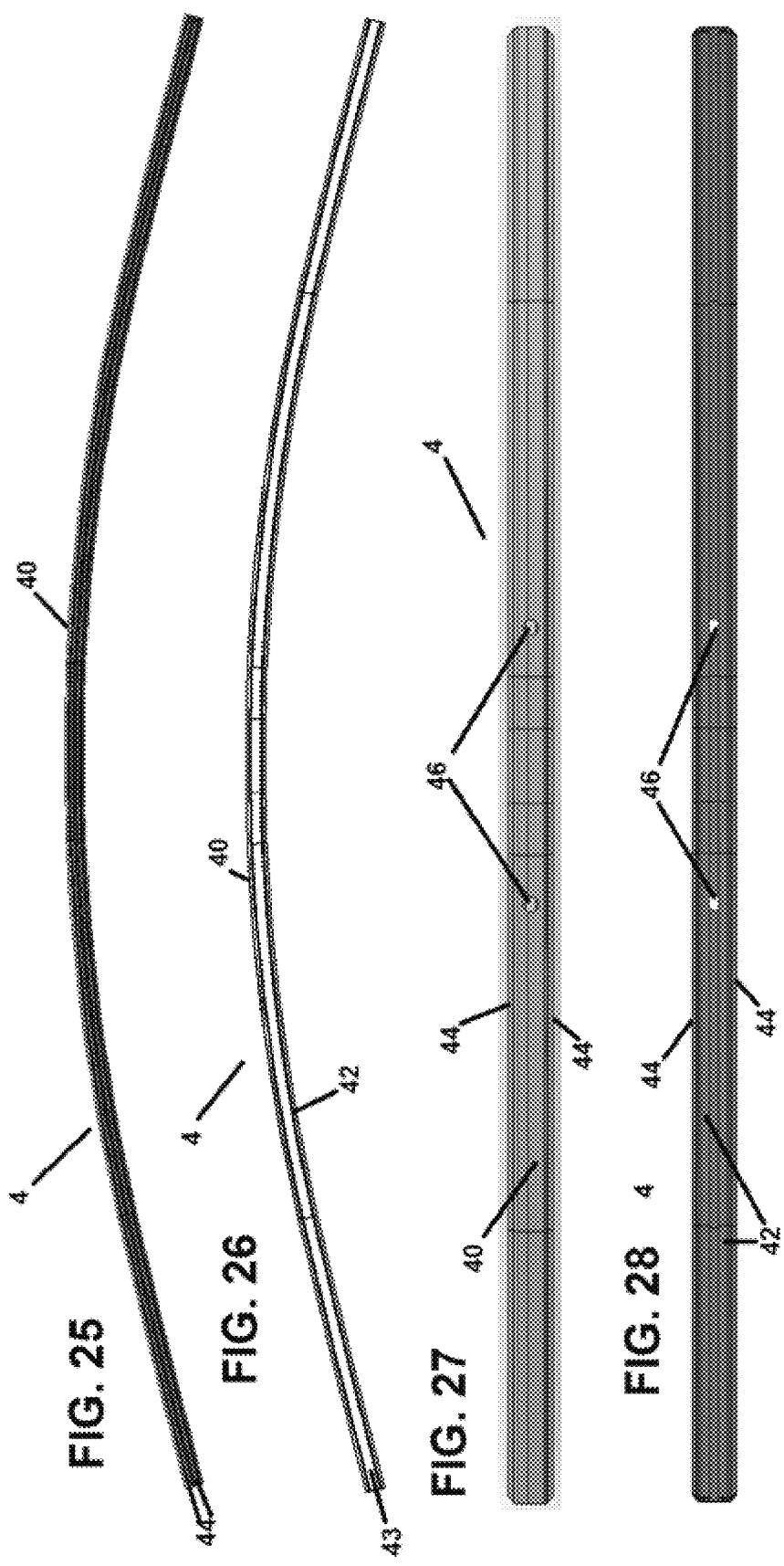

FIG. 29
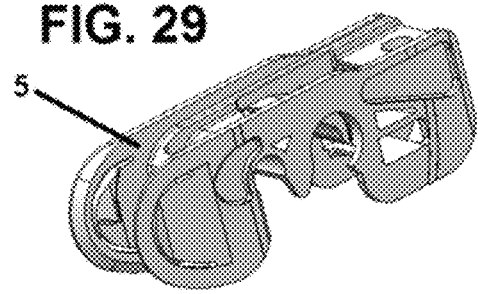
FIG. 30
FIG. 31
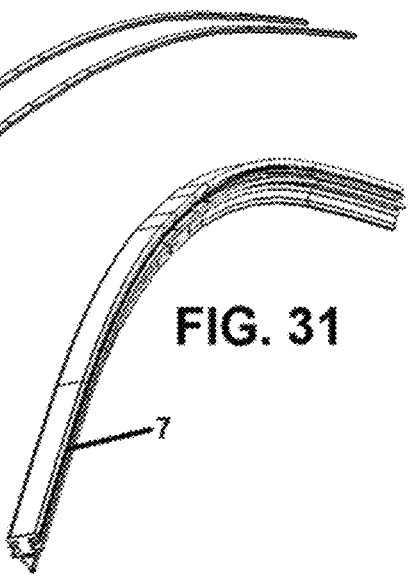
FIG. 32
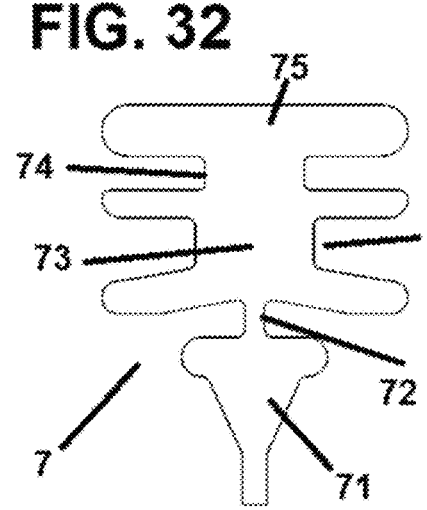
FIG. 33
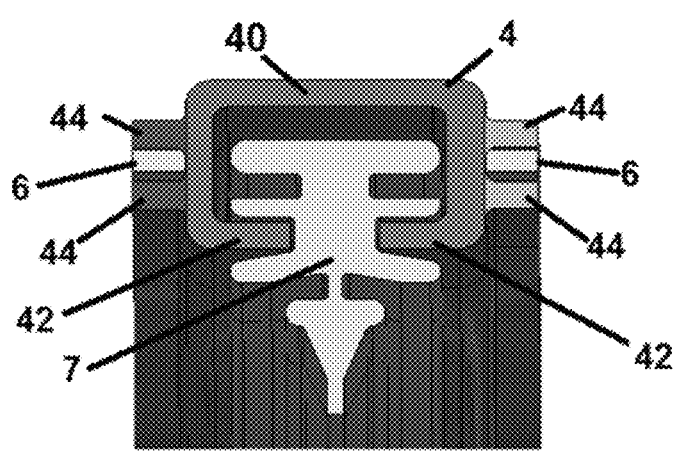

WINDSHIELD WIPER BLADE

CROSS-REFERENCE TO RELATED APPLICATIONS

This application is a continuation of U.S. patent application Ser. No. 15/335,138, filed Oct. 26, 2016, which claims priority from U.S. Provisional Patent Application No. 62/246,567, filed Oct. 26, 2015.

TECHNICAL FIELD

Aspects of the disclosure relate in general to windshield wipers, and more particularly, to a wiper blade including a backing element, a wiper strip, a mounting base and a cover.

BACKGROUND

There are a variety of different types of wiper blades currently used on vehicles. "Traditional" or "conventional" wiper blades have a series of brackets (also called yokes or frames) arranged in tournament-style, which distribute the force from the wiper arm down to the wiper strip. "Beam" wiper blades, or beam blades, use a spring-elastic metal beam (also called a support element) to distribute the force from the wiper arm to the wiper strip. "Hybrid" wiper blades use both a beam and brackets to distribute the force from the wiper arm to the wiper strip.

The disclosed concepts offer a new solution, using a shaped backing element in place of a beam or traditional frames.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In certain embodiments, a wiper blade may include an elongate wiper strip, an elastic backing element and a mounting base. The elongate wiper strip may include a wiping lip, a wide portion, and an intermediate portion between the wiping lip and the wide portion, such that the intermediate portion is narrower than the wide portion. The elastic elongate backing element may have a top portion from which two opposing, elongate legs descend, such that each leg includes an elongate claw that extends towards the opposite leg. Each leg may have an end such that the ends of the claws of the two legs may define a gap sized to receive the intermediate portion of the wiper strip. The top portion, legs and claws of the backing element may define a wiper strip cavity such that the wide portion of the wiper strip may be disposed within the wiper strip cavity. The mounting base may be capable of connecting the wiper blade to a wiper arm, and capable of receiving a force from the wiper arm. The mounting base may be disposed on a section of the backing element such that the mounting base is capable of applying a force from the wiper arm to the backing element. In turn, the backing element may thereby be capable of distributing the force along the length of the wiper strip.

In certain embodiments, a wiper blade may include an elongate wiper strip, an elastic backing element, a mounting base and first and second cover sections. The wiper strip may include a wiping lip, a wide portion, and an intermediate portion between the wiping lip and the wide portion, such that the intermediate portion is narrower than the wide portion. The backing element may include a top portion from which two opposing, elongate legs descend, such that each leg comprises an elongate claw that extends towards the opposite leg. The claws may have ends such that the ends of the claws of the two legs may define a gap sized to receive the intermediate portion of the wiper strip. The top portion, legs and claws may define a wiper strip cavity such that the wide portion of the wiper strip is disposed within the wiper strip cavity. The mounting base may be capable of connecting the wiper blade to a wiper arm and receiving force from the wiper arm. The mounting base may be disposed on a section of the backing element such that the mounting base is capable of applying a force from the wiper arm to the backing element, and the backing element is capable of distributing the force along the length of the wiper strip. A first cover section may extend from a first end of the mounting base to a first end of the backing element. A second cover section may extend from a second end of the mounting base to a second end of the backing element. The first and second ends of the mounting base may be provided with projecting extensions. The first and second cover sections may be provided with extension recesses. The projecting extensions of the first and second ends of the mounting base may fit within, and be covered by, the extension recesses of the first and second cover sections, respectively.

In certain embodiments, a wiper blade may include an elongate wiper strip, an elastic backing element, a mounting base and a first cover section. The elongate wiper strip may include a wiping lip, a wide portion, and an intermediate portion between the wiping lip and the wide portion, wherein the intermediate portion is narrower than the wide portion. The elastic, elongate backing element may have a top portion from which two opposing, elongate legs descend, such that each leg may include an elongate claw that extends towards the opposite leg. The claws may each have an end such that the ends of the claws of the two legs may define a gap sized to receive the intermediate portion of the wiper strip. The top portion, legs and claws may define a wiper strip cavity and the wide portion of the wiper strip may be disposed within the wiper strip cavity. The mounting base may be capable of connecting the wiper blade to a wiper arm and may receive a force from the wiper arm. The mounting base may be disposed on a section of the backing element such that the mounting base may be capable of applying a force from the wiper arm to the backing element, and the backing element may be capable of distributing the force along the length of the wiper strip. The first cover section may extend from a first end of the mounting base to a first end of the backing element. The first end of the mounting base may include a projecting extension, and the first cover section may include an extension recess, such that the projecting extension fits within, and is covered by, the extension recess of the first cover section. The mounting base may further include a first and second base wall which may extend downwards from a bottom surface. Each base wall may be provided with a bottom base claw which extends inwardly towards the other base wall, such that the base walls cover and secure the portion of the backing element on which the mounting base is disposed.

BRIEF DESCRIPTION OF THE DRAWINGS

The drawings set forth exemplary embodiments of the disclosed concepts, and are not intended to be limiting in any way.

FIG. 1 illustrates a perspective view of an embodiment of a wiper blade.

FIG. 1B illustrates a perspective view of an exploded rendition of the components of the wiper blade shown in FIG. 1.

FIG. 2 illustrates a perspective view from above of the mounting base of the wiper blade shown in FIG. 1.

FIG. 3 illustrates a perspective view from below of the mounting base of the wiper blade shown in FIG. 1.

FIG. 4 illustrates a front view of the mounting base of the wiper blade shown in FIG. 1.

FIG. 5 illustrates a back view of the mounting base of the wiper blade shown in FIG. 1.

FIG. 6 illustrates a top view of the mounting base of the wiper blade shown in FIG. 1.

FIG. 7 illustrates a bottom view of the mounting base of the wiper blade shown in FIG. 1.

FIG. 8 illustrates a side view of the mounting base of the wiper blade shown in FIG. 1.

FIG. 9 illustrates a side view of the mounting base of the wiper blade shown in FIG. 1.

FIG. 10 illustrates a cross-sectional view from the front of the mounting base of the wiper blade shown in FIG. 1.

FIG. 11 illustrates a cross-sectional view from behind of the mounting base of the wiper blade shown in FIG. 1.

FIG. 12 illustrates a perspective view from above of a cover section of the wiper blade shown in FIG. 1.

FIG. 13 illustrates a perspective view from below of a cover section of the wiper blade shown in FIG. 1.

FIG. 14 illustrates a front view of a cover section of the wiper blade shown in FIG. 1.

FIG. 15 illustrates a back view of a cover section of the wiper blade shown in FIG. 1.

FIG. 16 illustrates a cross-sectional view from the front of a cover section of the wiper blade shown in FIG. 1.

FIG. 17 illustrates a cross-sectional view from behind of a cover section of the wiper blade shown in FIG. 1.

FIG. 18 illustrates a side view of a cover section of the wiper blade shown in FIG. 1.

FIG. 19 illustrates a side view of a cover section of the wiper blade shown in FIG. 1.

FIG. 20 illustrates a perspective view from below of a cover section of the wiper blade shown in FIG. 1.

FIG. 21 illustrates a perspective view from above of the shaped backing element of the wiper blade shown in FIG. 1.

FIG. 22 illustrates a perspective view from below of the shaped backing element of the wiper blade shown in FIG. 1.

FIG. 23 illustrates a side view of the shaped backing element of the wiper blade shown in FIG. 1.

FIG. 24 illustrates a cross-sectional profile of the shaped backing element of the wiper blade shown in FIG. 1.

FIG. 25 illustrates a front view of the shaped backing element of the wiper blade shown in FIG. 1.

FIG. 26 illustrates a cross-sectional view from the front of the shaped backing element of the wiper blade shown in FIG. 1.

FIG. 27 illustrates a top view of the shaped backing element of the wiper blade shown in FIG. 1.

FIG. 28 illustrates a bottom view of the shaped backing element of the wiper blade shown in FIG. 1.

FIG. 29 illustrates an example connector that may be used with the wiper blade shown in FIG. 1.

FIG. 30 illustrates a perspective view from above of the vertebrae of the wiper blade shown in FIG. 1.

FIG. 31 illustrates a perspective view from above of the wiper strip of the wiper blade shown in FIG. 1.

FIG. 32 illustrates a cross-sectional profile of the wiper strip of the wiper blade shown in FIG. 1.

FIG. 33 illustrates a cross-sectional view from the side of the backing element, vertebrae and wiper strip of the wiper blade shown in FIG. 1.

DETAILED DESCRIPTION OF THE ILLUSTRATIVE EMBODIMENT

Figure 1A:
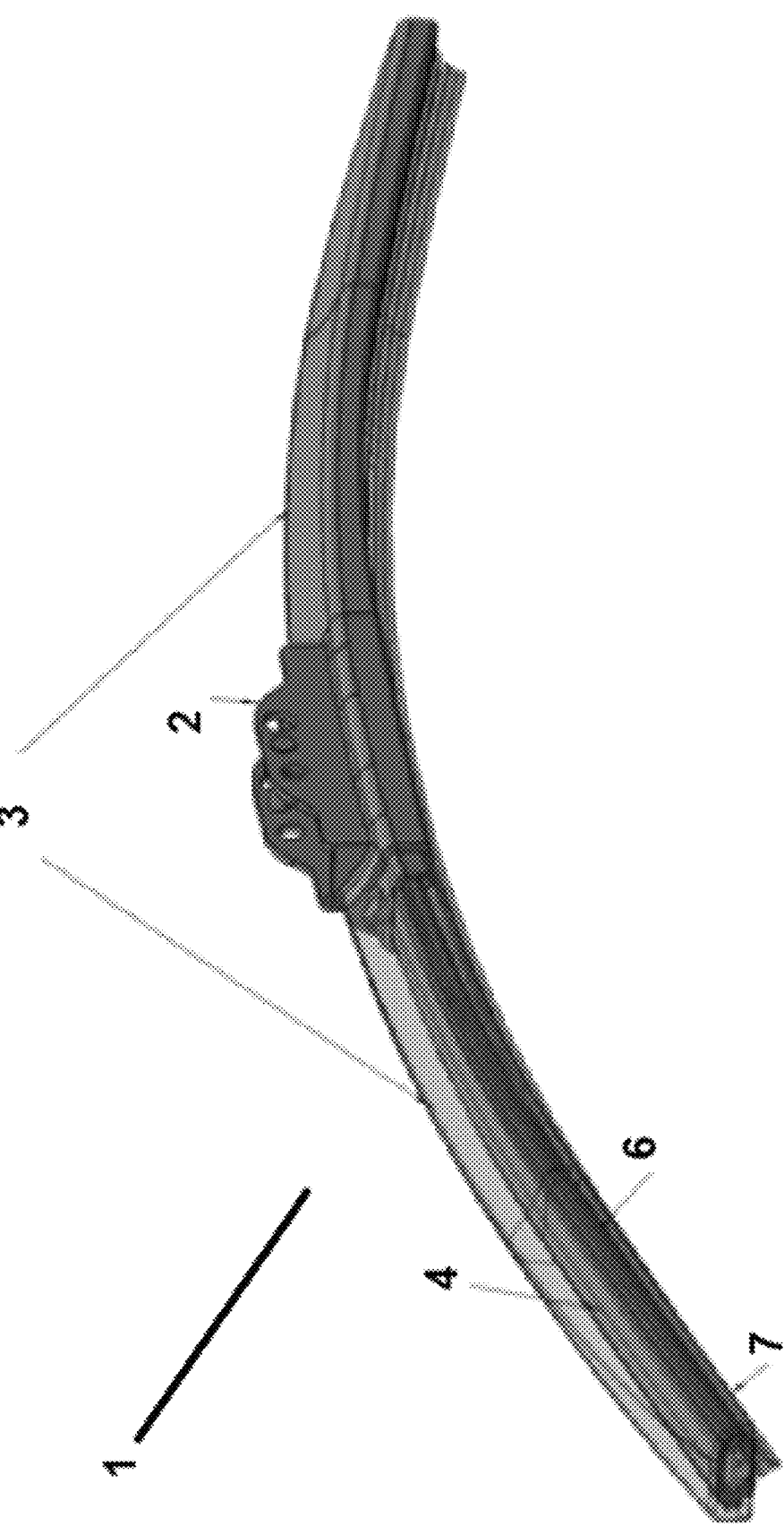
FIG. 1A illustrates a perspective view of the wiper blade shown in FIG. 1, with a portion of the cover drawn transparent.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

In certain embodiments a wiper blade may include an elongate wiper strip, an elastic backing element and a mounting base. The elongate wiper strip may include a wiping lip, a wide portion, and an intermediate portion between the wiping lip and the wide portion, such that the intermediate portion is narrower than the wide portion. The elastic elongate backing element may have a top portion from which two opposing, elongate legs descend, such that each leg includes an elongate claw that extends towards the opposite leg. Each leg may have an end such that the ends of the claws of the two legs may define a gap sized to receive the intermediate portion of the wiper strip. The top portion, legs and claws of the backing element may define a wiper strip cavity such that the wide portion of the wiper strip may be disposed within the wiper strip cavity. The mounting base may be capable of connecting the wiper blade to a wiper arm, and capable of receiving a force from the wiper arm. The mounting base may be disposed on a section of the backing element such that the mounting base is capable of applying a force from the wiper arm to the backing element. In turn, the backing element may, thereby, be capable of distributing the force along the length of the wiper strip.

In certain embodiments, the top portion of the backing element may include a securing hole disposed within the section of the backing element on which the mounting base is disposed. In certain such embodiments, the mounting base may include a backing element securing peg, wherein the backing element securing peg is disposed within the securing hole of the backing element.

In certain embodiments, a first cover section may extend from a first end of the mounting base to a first end of the backing element. In certain embodiments, the first end of the mounting base further comprises a projecting extension, and the first cover section may be provided with an extension recess, such that the projecting extension fits within, and is covered by, the extension recess of the first cover section. In certain such embodiments, the mounting base may also include a cover securing peg located on the projecting extension, and the first cover section may include a securing hole located in the extension recess, wherein the cover securing beg is located within the securing hole. In certain embodiments, a second cover section may extend from a second end of the mounting base to a second end of the backing element. In certain embodiments, the first cover section may be provided with at least one leg, such that the leg comprises a bottom claw, wherein the bottom claw secures the first cover section to the backing element.

In certain embodiments, the first cover section may include a backing element cavity, and the backing element may include a first covered section extending from the first end of the mounting base to the first end of the backing element, wherein the first covered section of the backing element is disposed within the backing element cavity of the first cover section. In certain such embodiments, the backing element cavity of the first cover section may include a backing element top cavity, such that the top portion of the backing element top cavity is disposed within the backing element top cavity along the first covered section of the backing element. In certain embodiments, the backing element may further include a first rail, and the first cover section may further include a backing element channel cavity such that the first rail of the backing element is disposed within the backing element channel cavity of the first cover section along the first covered section of the backing element. In certain embodiments, the backing element may include a second rail, wherein a first groove is formed by and between the first rail and the second rail. In certain such embodiments, a vertebra is disposed within the first groove. In certain embodiments, the backing element further comprises third and fourth rails, wherein a second groove is formed by and between the third and fourth rails, and a second vertebra is disposed within the second groove.

In certain embodiments, the first cover section may embody a spoiler having an apex and an attack surface. In certain embodiments, a vertebra may be disposed inside the wiper strip cavity above the wiper strip.

In certain embodiments, the mounting base may further include a first and second base wall which extend downwards from a bottom surface, such that each base wall is provided with a bottom base claw which extends inwardly towards the other base wall. The base walls may cover and secure the portion of the backing element on which the mounting base is disposed.

In certain embodiments, the mounting base may include a pair of cavity walls and a rivet extending therebetween such that the rivet may receive and secure a connector such that the mounting base is capable of connecting to a wiper arm through the use of the connector.

In certain embodiments, a wiper blade may include an elongate wiper strip, an elastic backing element, a mounting base and a first cover section. The elongate wiper strip may include a wiping lip, a wide portion, and an intermediate portion between the wiping lip and the wide portion, wherein the intermediate portion is narrower than the wide portion. The elastic, elongate backing element may have a top portion from which two opposing, elongate legs descend such that each leg may include an elongate claw that extends towards the opposite leg. The claws may each have an end such that the ends of the claws of the two legs may define a gap sized to receive the intermediate portion of the wiper strip. The top portion, legs and claws may define a wiper strip cavity and the wide portion of the wiper strip may be disposed within the wiper strip cavity. The mounting base may be capable of connecting the wiper blade to a wiper arm and may receive a force from the wiper arm. The mounting base may be disposed on a section of the backing element such that the mounting base may be capable of applying a force from the wiper arm to the backing element, and the backing element may be capable of distributing the force along the length of the wiper strip. The first cover section may extend from a first end of the mounting base to a first end of the backing element. The first end of the mounting base may include a projecting extension, and the first cover section may include an extension recess, such that the projecting extension fits within, and is covered by, the extension recess of the first cover section. The mounting base may further include a first and second base wall which may extend downwards from a bottom surface. Each base wall may be provided with a bottom base claw which extends inwardly towards the other base wall, such that the base walls cover and secure the portion of the backing element on which the mounting base is disposed.

FIGS. 1, 1A and 1B illustrate a wiper blade 1 which may have a mounting base 2, cover sections 3, a backing element 4, vertebrae 6, and a wiper strip 7. The mounting base 2 may be configured to connect to a wiper arm through the use of a connector 5 or an adapter. One possible connector 5 which may be used in accordance with the disclosed concepts is depicted in FIG. 29. Such a connector is described in U.S. Pat. No. 6,640,380, which is incorporated herein by reference in its entirety. Any other suitable connectors or adapters known in the art may also be used with the disclosed concepts, including the connectors described in U.S. Pat. Nos. 8,806,700 and 9,108,595, and U.S. Publication Nos. 2013/0185889, 2013/0192015, 2014/0283325 and 2015/0251637, which are each incorporated herein by reference in their entireties. Persons of skill in the art will also recognize that the mounting base may be specifically adapted to connect to a particular type of wiper arm directly without the use of a connector or an adapter, including the mounting base designs disclosed in U.S. Publication No. 2014/0082875, which is incorporated herein by reference in its entirety. Similarly, persons of skill in the art will recognize that the cover with a spoiler depicted in FIGS. 1, 1A and 1B is exemplary, and that any suitable cover, with or without a spoiler, may also be used in accordance with the disclosed concepts, including covers having spoilers with constant height and shape, covers having decreasing height, spoilers forming a centered isosceles triangle, or an off-center spoiler (as shown in FIGS. 1, 1A and 1B), including covers as described in U.S. Patent Publication Nos. 2012/0266405 and 2013/0205532, which are incorporated herein by reference in their entirety. Additionally, persons of ordinary skill in the art will recognize that any suitable wiper strip known in the art may be used in accordance with the disclosed concepts, including the wiper strips described in U.S. Provisional Application Ser. No. 62/139,383, which is incorporated herein by reference in its entirety.

One exemplary mounting base 2 that may be used in accordance with the disclosed concepts is illustrated in FIGS. 2-11. The mounting base is preferably made of hard plastic, though any other suitable material or combination of materials known in the art, including metals, rubber, and resins, may also be used. In some embodiments, the mounting base, or portions thereof, may be made from a material having a Shore Hardness A of 85±5 or greater. In some embodiments, the mounting base, or portions thereof, may be made from a material having a Shore Hardness A of 95±5 or greater. In other embodiments, the mounting base 2 may be made from multiple materials, or have multiple hardnesses. For example, in one such embodiment, the hardness of the cavity walls 20 and claws 241, 242, 261, 262 and the material joining same may be greater than the hardness of the other parts of the mounting base 2. For example, the cavity walls 20 and claws 241, 242, 261, 262 may be made from metal or hard plastic, while the other portions of the mounting base 2 may be made from a softer plastic or rubber. Persons of skill in the art will recognize that disclosed concepts may be implemented in many different ways, and different design choices may be made with respect to materials for all components, including the mounting base.

The mounting base 2 may have two or more cavity side walls 20 defining a cavity 23 therebetween. As shown in FIG. 2, two of the sidewalls 20 may extend in the longitudinal direction of the wiper blade 1, and a rivet 21 may extend and be secured between same. The mounting base may further have one or more pin holes 22 to allow the pin of a pin-type wiper arm to pass through and be secured, by a connector 5 or otherwise. The mounting base may further have a shoulder 25 having a shape that is complementary to, identical to, or otherwise follows the shape of the cover sections 3. The mounting base may have a base section 24 defining a backing element cavity 29 therewithin. The base section 24 may have a base bottom surface 240, legs, a base bottom claw 241, and a base top claw 242.

As shown in FIG. 3, the base bottom surface 240 may be recessed from the top claw 242 to form a backing element top cavity 290. The base bottom claw 241 and base top claw 242 may form a groove having a backing element channel cavity 291 therewithin. The backing element cavity 29 may receive the backing element 4, with the top portion 40 of the backing element 4 being received by the backing element top cavity 290 and the rails 44 and vertebra 6 being received by the channel cavity 291. If no vertebrae are located in the groove 45 between the rails 44 of the backing element, the mounting base 2 may include an intermediate claw (not shown) to engage and accommodate the groove 45. The mounting base may further have one or more backing element securing pegs 28, which may extend from the base bottom surface 240 and engage securing holes 46 in the backing element. The mounting base 2 may also have one or more cover securing pegs 27 that engages with a securing hole 37 in the cover section in order to secure the cover section 3 to the mounting base 2.

Figure 34:
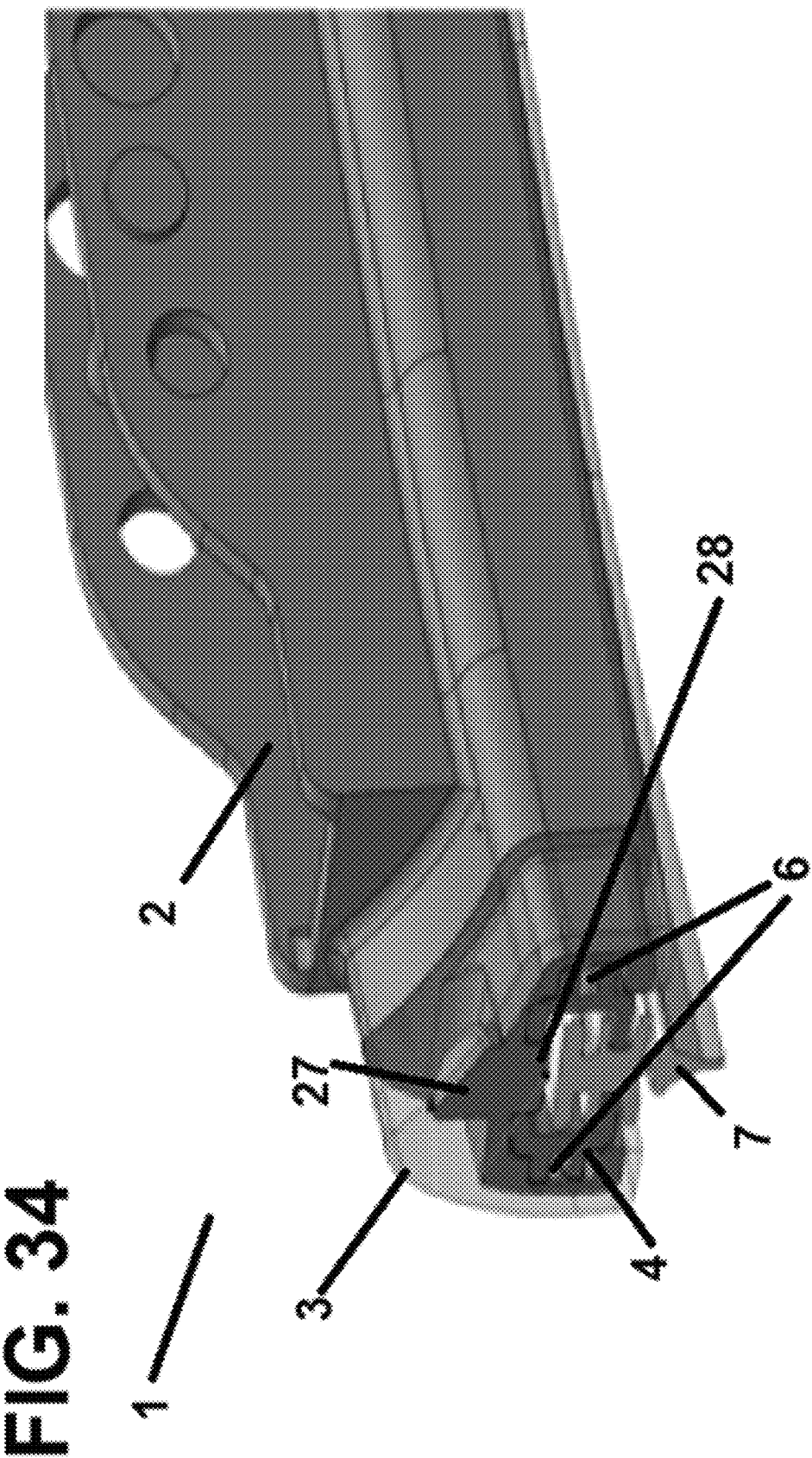
FIG. 34 illustrates a perspective view from above of the junction between the mounting base, backing element and cover section of the wiper blade shown in FIG. 1.
Figure 35:
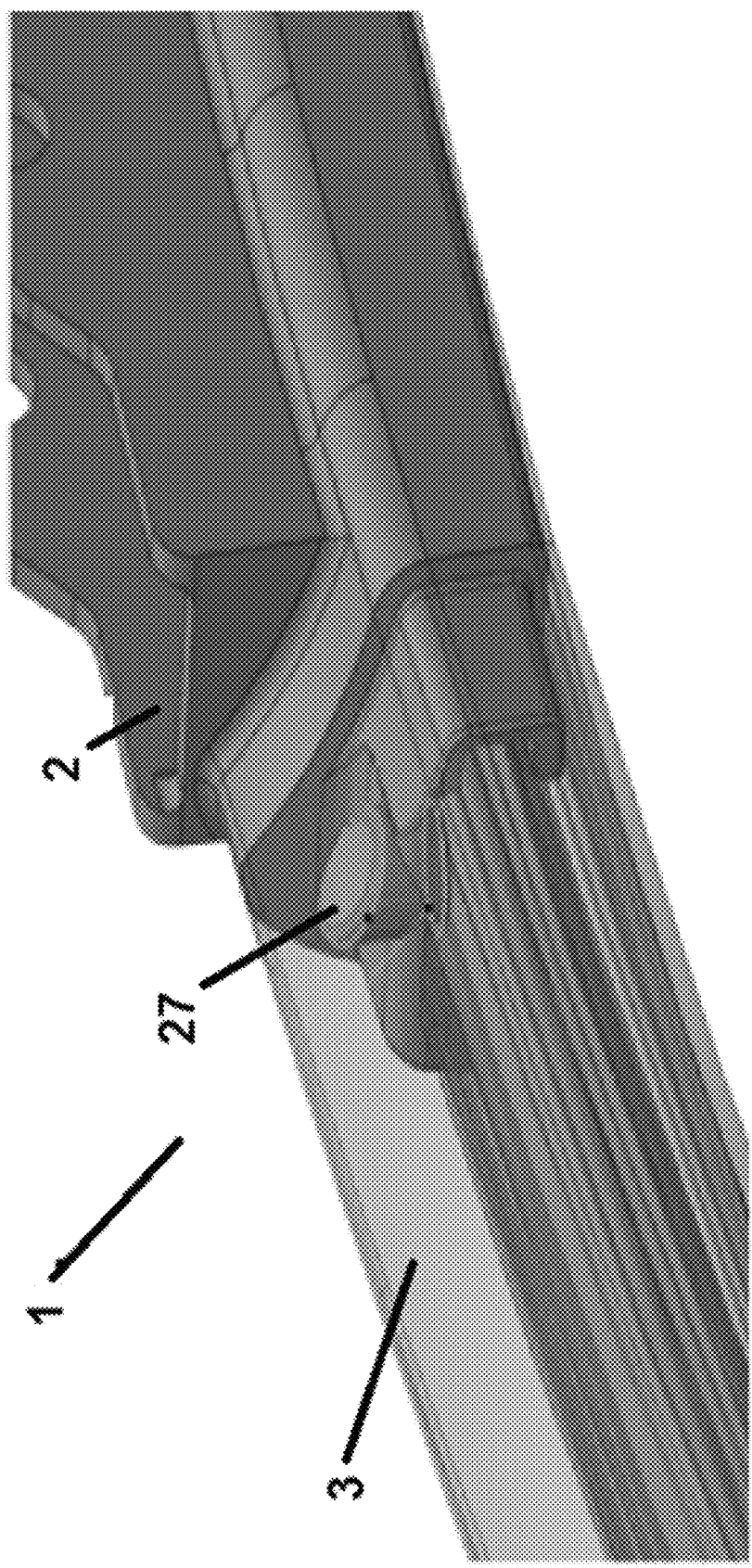
FIG. 35 illustrates a perspective view from above of the junction between the mounting base and cover section of the wiper blade shown in FIG. 1.

The mounting base may further have a projecting extension 26, which projects into, and is received by the extension recess 36 in the cover section 3, as shown in FIGS. 34 and 35. Persons of skill in the art will recognize that the projecting extension 26 and the extension recess 36 may be swapped such that the mounting base 2 may have an extension recess that receives a projecting extension from the cover section 3. As shown in FIGS. 2-6, the projecting extension 26 may be recessed from the base wall 24 and shoulder 25. As also shown in those figures, the securing pegs 27, 28 may be disposed on the projecting extension 26. The securing pegs 27, 28 and securing hole 37, 46 may engage via a snap fit, friction fit, or other form fitting connection. Persons of skill in the art will recognize that the securing mechanism may be swapped, having the securing holes located in the mounting base 2, and the securing pegs located in the cover section/backing element. Persons of skill in the art will also recognize that any other suitable securing mechanism known in the art may be used, including detents and recesses, dovetails, opposed projections, and other such structures may be used. Persons of skill in the art will also recognize that the securing mechanism need not be on the top surface of the projecting extension, but may be on the side, or may extend from the side of the shoulder, or any other arrangement known in the art.

As shown in FIGS. 3 & 7, the base bottom surface 240 may extend and continue into the projection 26. Similarly, the projecting extension may include an extension top claw 262 and an extension bottom claw 261 that may extend from and be aligned with the top base claw 242 and bottom base claw 241, respectively.

FIGS. 12-20 illustrate an exemplary cover section 3 in accordance with the disclosed concepts. The cover section 3 is preferably made of soft, elastic plastic or rubber, although any other suitable material or combination of materials known in the art, such as resins and silicon, for instance, may be used. In some embodiments, the cover section, or portions thereof, may be made from a material having a Shore Hardness A of 70±5 or less. In other embodiments, the cover section, or portions thereof, may be made from a material having a Shore Hardness A of 60±5 or less. In other embodiments, the mounting base 2 may be made from multiple materials, or having multiple hardnesses. It may be advantageous to have some portions of the cover section, such as the claws, made from a harder material, such as one having a Shore Hardness A of 85±5 or greater, or one having a Shore Hardness A of 95±5 or greater. For example, in one such embodiment, the hardness of the claws 32, 34 352 may be greater than the hardness of the other parts of the cover section 3. For example, the claws 32, 34 352 may be made from hard plastic, while the other portions of the cover section 3 may be made from a softer plastic or rubber. Persons of skill in the art will recognize that disclosed concepts may be implemented in many different ways, and different design choices may be made with respect to materials for all components, including the cover section.

Figure 36:
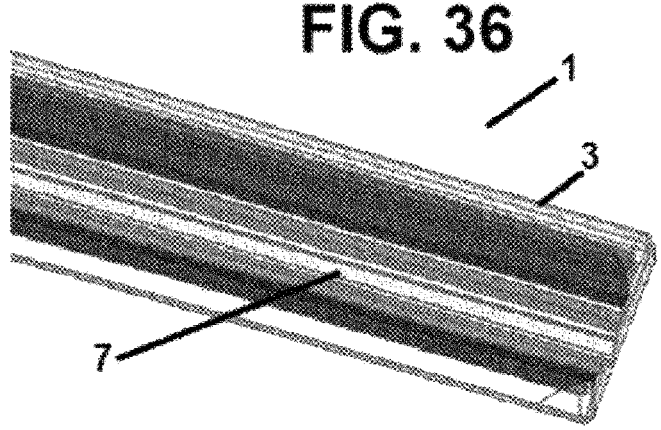
FIG. 36 illustrates a perspective view from below of the end of the wiper strip and cover section of the wiper blade shown in FIG. 1.

The cover section 3 may include a top surface 30. As discussed above, any suitable cover known in the art may be used, with or without a spoiler. As shown in FIGS. 12-20, the top surface of the cover 30 may form a spoiler having an apex 300, an attack surface 301, and a back surface 302. As shown in FIG. 12, the attack surface 302 may be concave. The cover may further have at least one leg 31, where the back surface 302 may blend into, or be in line with, the leg 31. Thus, the bottom portion of the back surface 302 may also be considered a leg 31. As discussed above, the apex 300 may be centered (not shown), and the back surface may also be provided with an attack surface such that the spoiler forms an isosceles triangle (with or without concave attack surface sides) such that the front of the wiper blade 1 functions the same as the back of the wiper blade 1. As illustrated in FIG. 12, the apex 300 may end before the end of cover section 3, and a top wall 303 may join the attack surface 301 and the back surface 302. An end wall 35 may be provided and used to join the ends of the top surface 30 (including the top wall 303, attack surface 301, back surface 302, and/or the apex 300) and the leg(s) 31. As shown in FIG. 36, the end wall 35 encapsulates and surrounds the wiper strip 7 and backing element 4.

As discussed above, the inner end of the cover section 3, adjacent to the mounting base 2, may have an extension recess 36, which receives the projecting extension 26 from the mounting base 2. As also discussed above, an extension recess 36 may be provided with a securing hole 37 that receives a cover securing peg 27 from the mounting base. As discussed above, persons of skill in the art will recognize that the cover securing peg 27 and securing hole 37 may engage via a snap fit, friction fit, or other form fitting connection. Persons of skill in the art will recognize that securing mechanism may be swapped, having the securing holes located in the mounting base 2, and the securing pegs located in the cover section/backing element. Persons of skill in the art will also recognize that any other suitable securing mechanism known in the art may be used, including detents and recesses, dovetails, opposed projections, and other such structures may be used. Persons of skill in the art will also recognize that the securing mechanism need not be on the top surface of the projecting extension and bottom surface of the extension recess, but may be on the side, or may extend from the side of the shoulder, or any other arrangement known in the art. The extension recess 36 may have walls and a bottom claw 362 to cover and secure the projecting extension 26 of the mounting base.

The cover section may also have a bottom surface 38. The bottom surface 38, together with the legs 31, may define a backing element cavity 33 to receive the backing element 4. Each leg 31 may also define a top claw 34 and a bottom claw 32. The bottom surface 38 may be recessed from the top claws 34 such that the backing element cavity 33 may have a top cavity 330 to receive a top portion 40 of the backing element 4. The legs 31, including the top claws 34 and bottom claws 32, may define one or more channel cavities 331, which may be sized to receive the rails 44 of the backing element 4, and one or more vertebrae 6. If no vertebrae are included, the legs may define an intermediate claw to engage a groove 45, if one is present between the rails 44. The claws 32, 34 may extend along the entire length of the cover section, or may be intermittent, or have gaps. The cover section may optionally have backing element securing structures, such as pegs, detents, shoulders, projections, recesses, holes, and other such structures known in the art, along the bottom surface 38, the claws 32, 34 or the groove formed therebetween, such that these securing structures engage corresponding complementary securing structures in the backing element 4, such as holes, shoulders, detents, recesses, projections, pegs and other such structures known in the art.

FIGS. 21-28 illustrate an exemplary backing element 4 in accordance with the disclosed concepts. The backing element 4 is preferably made of hard, elastic plastic, though any other suitable material or combination of materials known in the art, including metals, rubber, and resins, for example, may be used. In some embodiments, the backing element 4, or portions thereof may be made from a material having a Shore Hardness A of 85±5 or greater. In some embodiments, the backing element 4, or portions thereof, may be made from a material having a Shore Hardness A of 95±5 or greater. In other embodiments, the backing element 4 may be made from multiple materials, or have multiple hardnesses. Persons of skill in the art will recognize that disclosed concepts may be implemented in many different ways, and different design choices may be made with respect to materials for all components, including the mounting base. The backing element may connect to the mounting base 2, which in turn is capable of connecting to a wiper arm directly or through the use of a connector 5 or adapter. The backing element 5, alone or with the help of the vertebrae, distribute the force received from the wiper arm along the length of the wiper strip 7.

The elongate backing element 4 may have a top portion 40, from which two opposing legs 41 descend. Each opposing leg may have a claw 42 which extends towards the opposing leg. The claws 42, legs 41, and top portion 40 may define a wiper strip cavity 43 sized to receive the wide portion 75 of a wiper strip 7. Similarly, the opposing claws 42 may define a gap therebetween sized to receive the intermediate portion of 73 of a wiper strip 7—which may be narrower than the wide portion 75 of the wiper strip 7—by engaging a recess or securing groove 76 (these terms may be used interchangeably) adjacent to the intermediate portion 73.

The backing element 4 may also have rails 44 extending along the outer surface of the legs 41 or extending from the top portion 40. As shown in FIG. 24, there may be two rails 44 extending from each outer surface of the legs 41/top portion 40 to define a groove 45 therebetween. The groove 45 may be sized to receive a vertebra 6 or flexor 6 (these terms may be used interchangeably). The rails 44 may extend along the entire length of the backing element 4, or may be intermittent or have gaps. In certain embodiments where no vertebrae are used on the outside of the backing element, the groove 45 between the rails 44 may optionally be removed. Alternatively, in other embodiments, not using rails 44 or grooves 45, the cavities in the mounting base 2 and cover sections 3 may be sized to receive and secure the entire backing element 4.

As discussed above, the backing element 4 may have securing holes 46 to receive securing pegs 28 in the mounting base. As also discussed above, the backing element may also have other securing structures, including pegs, projections, detents, recesses, holes, shoulders, and any other suitable structure known in the art in order to engage and secure a complementary structure in the mounting base 2 or cover sections 3.

As discussed above, FIG. 29 illustrates an exemplary connector that may be used in accordance with the disclosed concepts to connect the mounting base to a wiper arm. Persons of skill in the art will recognize that any suitable connector known in the art may be used with the disclosed concepts, including those set forth above and incorporated by reference.

Figure 38:
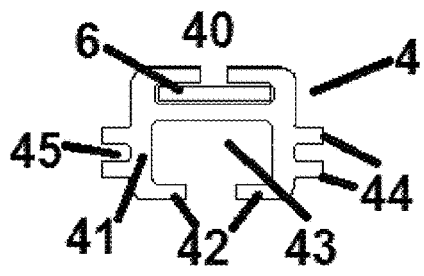
FIG. 38 illustrates a cross-sectional view of an alternative embodiment of the backing element.
Figure 39:
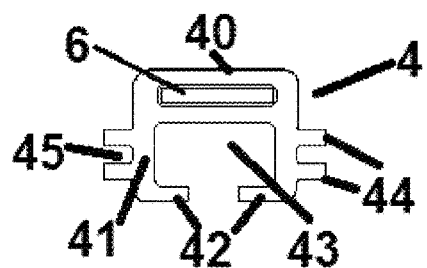
FIG. 39 illustrates a cross-sectional view of an alternative embodiment of the backing element.
Figure 40:
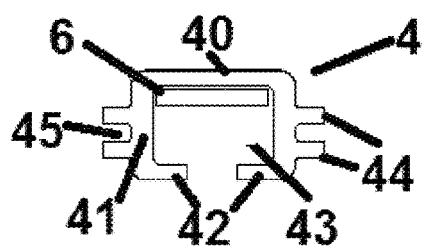
FIG. 40 illustrates a cross-sectional view of an alternative embodiment of the backing element.

FIG. 30 illustrates vertebrae in accordance with the disclosed concepts. The vertebrae are preferably made out of metal, such as steel, though may be made from any suitable material. The vertebrae may be made from a spring-elastic material, including spring-elastic metal. Accordingly, the vertebrae 6 may, with the backing element 4, distribute the force received from a wiper arm along the length of the wiper strip 7. Vertebrae may also be disposed within grooves 74 in the wide portion 75 of the wiper strip 7. In embodiments not having grooves 45 and/or outer rails 44 on the backing element 4, the vertebrae may be disposed in grooves 75 in the wiper strip, or may be disposed above the wiper strip, as shown in FIGS. 38-40.

FIGS. 31 & 32 illustrate an example wiper strip that may be used in accordance with the disclosed concepts. The wiper strip is preferably made of a soft rubber or plastic, but may be made of any suitable material. The wiper strip may have a wide portion 75 from which a narrower, intermediate portion 73 descends. The wide portion 75 may optionally have one or more grooves 74 which may optionally house vertebrae 6. The intermediate portion may be sized to fit between the claws 42 of the backing element 4, and may have a recessed portion or securing groove 76 which is sized to receive the claws 42.

FIG. 33 illustrates the backing element 4 of the disclosed concepts having vertebrae 6 disposed between its rails 44, and a wiper strip 7 disposed within its wiper strip cavity 43.

FIG. 34 illustrates the securing pegs 27, 28 in the mounting base which secure the carrier element 4 and cover section 3 to the mounting base 2.

FIG. 35 illustrates the securing pegs 27 in the mounting base which secures the cover section 3 to the mounting base 2.

FIGS. 1 and 36 illustrate how the end wall 35 of the cover section 3 surrounds and encapsulates the backing element 4 and wiper strip 7 to secure them against longitudinal movement.

Figure 37:
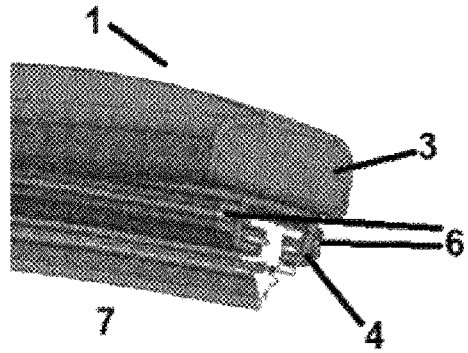
FIG. 37 illustrates a perspective view from the side of the end of the wiper strip, backing element, vertebrae and cover section of the wiper blade shown in FIG. 1.

FIG. 37 illustrates how the cover section 3 of the disclosed concept can be disengaged from the rails 44 of the backing element 4 and folded upwards. This allows a user to slidably remove the wiper strip 7 from the backing element 4 and to replace it with a new wiper strip 7. In this fashion, the disclosed concept allows for a refillable wiper blade, such that the end user of the product does not need to replace the entire product when ordinary wear and tear on the wiper strip 7 requires its replacement. Instead, the user can simply fold up the end of the cover section 3 of the wiper blade 1, as shown in FIG. 37, and quickly remove the old wiper strip and slide in a new wiper strip. In some embodiments, the claws 32, 34 of the cover section may end a distance away from the end wall 35 to facilitate the folding up of the cover strip to allow access to the backing element 4 and wiper strip 7.

As discussed above, FIGS. 38-40 illustrate alternative embodiments of the backing element 4 having a singular internal vertebra. If the embodiment illustrated in FIG. 38, the top portion 40 of the backing element contains a gap, there is an internal wall defining a cavity between the top portion and the internal wall, and the vertebra 6 resides in that cavity. In the embodiment illustrated in FIG. 39, there is an internal wall defining a cavity between the top portion 40 and the internal wall and the vertebra 6 resides in that cavity. In the embodiment illustrated in FIG. 40, there vertebra 6 is inserted into the wiper strip cavity 43 above the wiper strip.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

Accordingly, the foregoing descriptions are intended as illustrative, and not as limiting. List of reference numbers.
1. Wiper blade.
2. Mounting base.
20. Cavity walls.
21. Rivet.
22. Pin holes.
23. Connector cavity.
24. Base wall.
240. Base bottom surface.
241. Bottom base claw.
242. Top base claw.
25. Shaped shoulder.
26. Projecting extension.
261. Extension bottom claw.
262. Extension top claw.
27. Cover securing peg.
28. Backing element securing peg.
29. Backing element cavity.
290. Backing element top cavity.
291. Backing element channel cavity.
3. Cover section.
30. Top surface.
300. Apex.
301. Attack surface.
302. Back surface.
303. Top wall.
31. Leg.
32. Bottom claw.
33. Backing element cavity.
330. Backing element top cavity.
331. Backing element channel cavity.
34. Top claw.
35. End wall.
36. Extension recess.
362. Extension bottom claw.
37. Securing hole.
38. Bottom surface.
4. Backing element.
40. Top portion.
41. Legs.
42. Claw.
43. Wiper strip cavity.
44. Rail.
45. Groove.
46. Securing hole.
5. Connector.
6. Vertebra/vertebrae.
7. Wiper strip.
71. Wiper lip.
72. Neck.
73. Intermediate portion.
74. Vertebra groove.
75. Wide portion.
76. Securing groove.

I claim:
1. A wiper blade comprising:
an elongate wiper strip comprising a wiping lip, a wide portion, and an intermediate portion between the wiping lip and the wide portion, wherein the intermediate portion is narrower than the wide portion;
an elastic elongate backing element having a top portion from which two opposing, elongate legs descend, wherein each leg comprises an elongate claw that extends towards the opposite leg and having an end such that the ends of the claws of the two legs may define a gap sized to receive the intermediate portion of the wiper strip, such that the top portion, legs and claws define a wiper strip cavity and the wide portion of the wiper strip is disposed within the wiper strip cavity; and
a mounting base that is capable of connecting the wiper blade to a wiper arm, and receiving a force from the wiper arm, wherein the mounting base is disposed on a section of the backing element such that the mounting base is capable of applying a force from the wiper arm to the backing element, and the backing element is capable of distributing the force along the length of the wiper strip, wherein a first longitudinal end of the mounting base further comprises a projecting extension with a backing securing peg, and wherein the top portion of the backing element further comprises a securing hole disposed within the backing element, and the backing element securing peg is disposed within the securing hole.

2. The wiper blade of claim 1, further comprising a first cover section extending from a first end of the mounting base to a first end of the backing element.

3. The wiper blade of claim 2, wherein the first cover section is further provided with an extension recess, such that the projecting extension fits within, and is covered by the extension recess of the first cover section.

4. The wiper blade of claim 2, further comprising a second cover section extending from a second end of the mounting base to a second end of the backing element.

5. The wiper blade of claim 2, wherein the first cover section is provided with at least one leg, such that the leg comprises a bottom claw, wherein the bottom claw secures the first cover section to the backing element.

6. The wiper blade of claim 2, wherein the first cover section further comprises a backing element cavity, and the backing element further comprises a first covered section extending from the first end of the mounting base to the first end of the backing element, wherein the first covered section of the backing element is disposed within the backing element cavity of the first cover section.

7. The wiper blade of claim 6, wherein the backing element cavity of the first cover section further comprises a backing element top cavity, wherein the top portion of the backing element is disposed within the backing element top cavity along the first covered section of the backing element.

8. The wiper blade of claim 6, wherein the backing element further comprises a first rail, and the first covered section further comprises a backing element channel cavity such that the first rail of the backing element is disposed within the backing element channel cavity of the first section along the first covered section of the backing element.

9. The wiper blade of claim 8, wherein the backing element further comprises a second rail, wherein a first groove is formed by and between the first rail and the second rail.

10. The wiper blade of claim 9, wherein a vertebra is disposed within the first groove.

11. The wiper blade of claim 2, wherein the first cover section embodies a spoiler having an apex and an attack surface.

12. The wiper blade of claim 1, wherein a vertebra is disposed inside the wiper strip cavity, above the wiper strip.

13. The wiper blade of claim 1, wherein the mounting base further comprises a first and second base wall which extend downwards from a bottom surface, and wherein each base wall is provided with a bottom base claw which extends inwardly towards the other base wall, such that the base walls cover and secure the portion of the backing element on which the mounting base is disposed.

14. The wiper blade of claim 1, wherein the mounting base further comprises a pair of cavity walls and a rivet extending therebetween such that the rivet may receive and secure a connector such that the mounting base is capable of connecting to a wiper arm through the use of the connector.

15. A wiper blade comprising:

an elongate wiper strip comprising a wiping lip, a wide portion, and an intermediate portion between the wiping lip and the wide portion, wherein the intermediate portion is narrower than the wide portion;

an elastic elongate backing element having a top portion from which two opposing, elongate legs descend, wherein each leg comprises an elongate claw that extends towards the opposite leg and having an end such that the ends of the claws of the two legs may define a gap sized to receive the intermediate portion of the wiper strip, such that the top portion, legs and claws define a wiper strip cavity and the wide portion of the wiper strip is disposed within the wiper strip cavity;

a mounting base that is capable of connecting the wiper blade to a wiper arm, and receiving a force from the wiper arm, wherein the mounting base is disposed on a section of the backing element such that the mounting base is capable of applying a force from the wiper arm to the backing element, and the backing element is capable of distributing the force along the length of the wiper strip; and a first cover section extending from a first end of the mounting base to a first end of the backing element and a second cover section extending from a second end of the mounting base to a second end of the backing element;

wherein the first and second ends of the mounting base comprises projecting extensions, and the first and second cover sections comprise extension recesses, such that the projecting extensions of the first and second ends of the mounting base fit within, and are covered by, the extension recesses of the first and second cover sections, respectively, and wherein a backing element securing peg is provided on each of the projecting extensions, the elastic elongate backing element includes a pair of securing holes, and each backing element securing peg is disposed in one of the securing holes.

16. A wiper blade comprising:

an elongate wiper strip comprising a wiping lip, a wide portion, and an intermediate portion between the wiping lip and the wide portion, wherein the intermediate portion is narrower than the wide portion;

an elastic elongate backing element having a top portion from which two opposing, elongate legs descend, wherein each leg comprises an elongate claw that extends towards the opposite leg and having an end such that the ends of the claws of the two legs may define a gap sized to receive the intermediate portion of the wiper strip, such that the top portion, legs and claws define a wiper strip cavity and the wide portion of the wiper strip is disposed within the wiper strip cavity;

a mounting base that is capable of connecting the wiper blade to a wiper arm, and receiving a force from the wiper arm, wherein the mounting base is disposed on a section of the backing element such that the mounting base is capable of applying a force from the wiper arm to the backing element, and the backing element is capable of distributing the force along the length of the wiper strip; and a first cover section extending from a first end of the mounting base to a first end of the backing element;

wherein the first end of the mounting base comprises a projecting extension, and the first cover section is further provided with an extension recess, such that the projecting extension fits within, and is covered by, the extension recess of the first cover section; and wherein the mounting base further comprises a first and second base wall which extend downwards from a bottom surface, and wherein each base wall is provided with a bottom base claw which extends inwardly towards the other base wall, such that the base walls cover and secure the portion of the backing element on which the mounting base is disposed, and wherein a backing element securing peg is provided on each of the projecting extensions, the elastic elongate backing element includes a pair of securing holes, and each backing element securing peg is disposed in one of the securing holes.

* * * * *